United States Patent
Hafez

(10) Patent No.: US 6,804,343 B2
(45) Date of Patent: Oct. 12, 2004

(54) METHOD FOR DESTINATION CONTROL IN AN INTELLIGENT NETWORK

(75) Inventor: Tania Abdel Hafez, Eichenau (DE)

(73) Assignee: Siemens Aktiengesellschaft, Munich (DE)

( * ) Notice: Subject to any disclaimer, the term of this patent is extended or adjusted under 35 U.S.C. 154(b) by 454 days.

(21) Appl. No.: 09/867,295

(22) Filed: May 29, 2001

(65) Prior Publication Data

US 2002/0018550 A1 Feb. 14, 2002

(30) Foreign Application Priority Data

May 26, 2000 (EP) .......................................... 00111415

(51) Int. Cl.⁷ .............................................. H04M 3/42
(52) U.S. Cl. .............................. 379/211.01; 379/211.02; 379/201.01
(58) Field of Search ........................ 379/211.01, 211.02, 379/211.03, 211.04, 210.01, 212.01, 201.01–201.12, 219, 913

(56) References Cited

U.S. PATENT DOCUMENTS 5,467,388 A    11/1995  Redd, Jr. et al.
6,011,975 A     1/2000  Emery et al.
6,104,799 A  *  8/2000  Jain et al. .................... 379/210
6,480,593 B1 * 11/2002  Munday et al. ........ 379/211.02

FOREIGN PATENT DOCUMENTS

WO    WO 99/01992    1/1999

* cited by examiner

Primary Examiner—William J. Deane
(74) Attorney, Agent, or Firm—Bell, Boyd & Lloyd LLC

(57) ABSTRACT

A method for destination control in an intelligent network, where a destination list for a subscriber's telephone number is provided which has entries associating particular connections with the subscriber during predetermined time periods, as a result of which incoming calls for the subscriber's telephone number are transferred to an appropriate connection indicated as destination in the entry. When the subscriber logs on and/or off at a terminal using an access point to the intelligent network, an event message is transmitted which changes the destination list, the event message being evaluated by taking into account conditions, and a corresponding entry in the destination list being ascertained and/or changed on such basis.

11 Claims, 1 Drawing Sheet

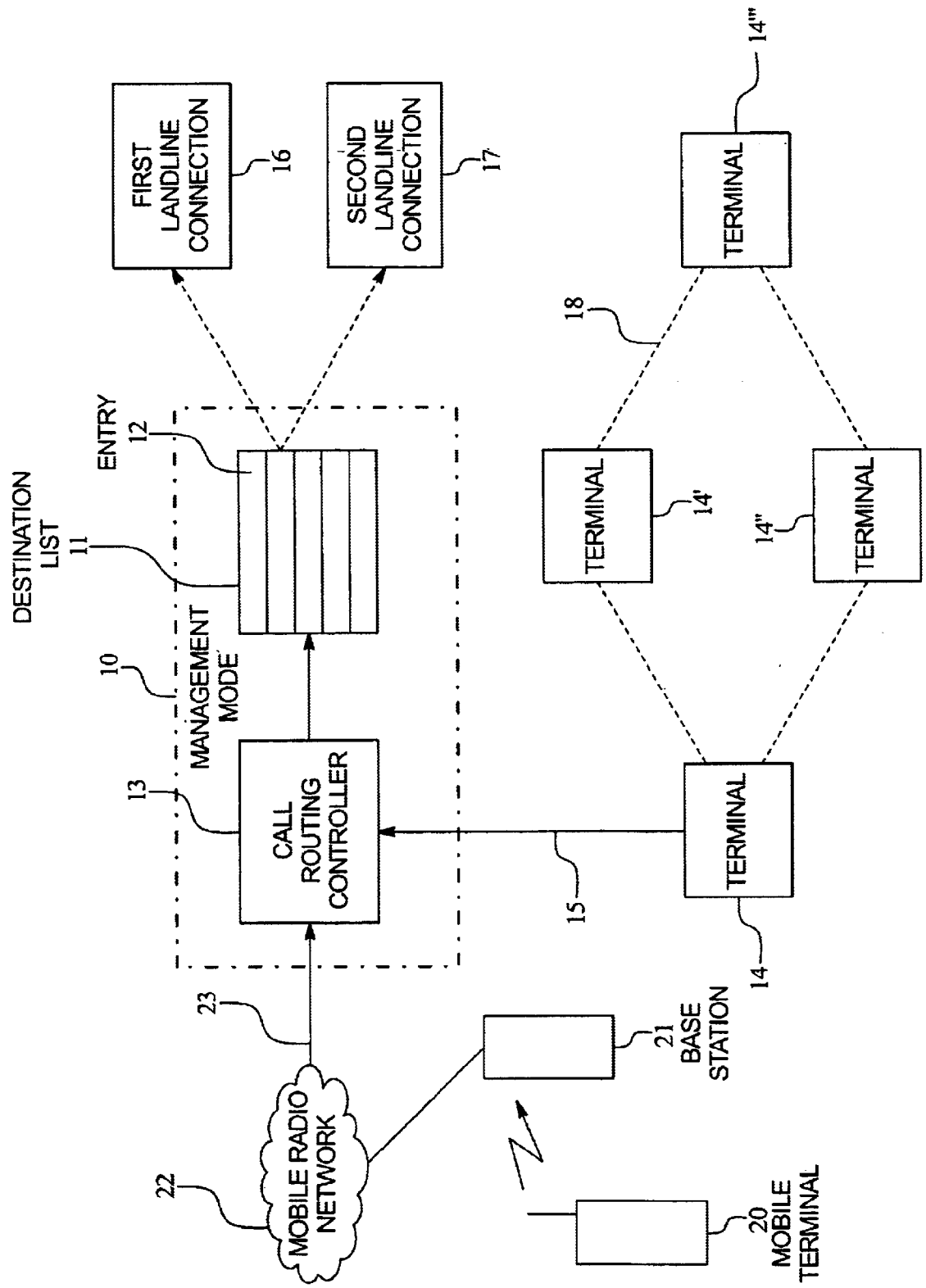

METHOD FOR DESTINATION CONTROL IN AN INTELLIGENT NETWORK

BACKGROUND OF THE INVENTION

1. Field of the Invention

The present invention relates, generally, to a method for destination control in an intelligent network and, more specifically, to such a method wherein a destination list associated with a subscriber in the intelligent network is changed by virtue of an event message being transmitted when the subscriber logs on and/or logs off at a terminal which has access to the intelligent network.

2. Description of the Prior Art

An intelligent network allows allocation of a personal telephone number as a service. This service is also called a "one number service", because a subscriber has an associated telephone number which is independent of a particular (telephone) connection and, accordingly can be regarded as a virtual connection.

An incoming call to such a telephone number is transferred by the intelligent network, more precisely by a service control node in the intelligent network, to a connection on the basis of a destination list associated with the subscriber or with his telephone number.

Such a destination list, also called a "hunting list", contains the telephone numbers of particular landline connections, mobile connections or other connections. In addition, the destination list contains predetermined time periods associated with the individual connections as a validity period.

By way of example, such a destination list may contain an entry stipulating that a subscriber can be reached on a landline connection in the office during a period from 8:00 hours to 17:00 hours and can be reached on a landline connection in his/her house or apartment during a period from 17:00 hours to 8:00 hours. Accordingly, calls which are then received for the subscriber during the period from 8:00 hours to 17:00 hours are routed to the landline connection in the office, whereas calls received during the period from 17:00 hours to 8:00 hours are routed to the landline connection in the subscriber's apartment or house.

As a further service component of the intelligent network, the entries in the destination list can be changed by the subscriber himself/herself. The service provided for this purpose is called "customer service configuration" (CSC) and is now available over an Internet link for the service management node. For this purpose, the subscriber can use a web browser to call an IP address associated, by way of example, with a service management node of the intelligent network, and can change the entries in the destination list himself/herself. This service is called Web CSC. However, the entries in the destination list have to be changed manually by the subscriber whenever it is desired to set a different time sequence, for example other office times, or to change connections. Changing the destination list requires firstly Internet access and secondly a large amount of time.

It is, therefore, an object of the present invention to propose a method for destination control in an intelligent network which is much more flexible than manual administration and changing of destination lists and, in particular, adjusts itself largely independently to the whereabouts and reachability of a subscriber.

SUMMARY OF THE INVENTION

Accordingly, a fundamental aspect of the present invention is that a destination list associated with a subscriber in an intelligent network is changed by virtue of an event message being transmitted when a subscriber logs on and/or off at a terminal which has access to the intelligent network. This event message acts as a trigger for the intelligent network, in particular for a service management node for administering the services of the network, which changes the subscriber's destination list. The event message is evaluated by taking into account conditions, and a corresponding entry in the destination list is ascertained and/or changed on the basis of the evaluation.

By way of example, upon logging on at a terminal in the subscriber's office, the destination list can be changed such that all subsequent incoming calls for the subscriber are transferred to a landline connection in the office. Accordingly, upon logging off from the terminal in the office, the destination list can be changed so as to transfer incoming calls for the subscriber to the scriber's mobile connection (a mobile telephone). If the subscriber logs on at a terminal at home, the destination list is, in turn, adjusted such that all incoming calls for the subscriber are now routed to his or her landline connection at home. The method according to the present invention advantageously changes the destination list automatically on the basis of event reports or messages without the need for manual intervention by the subscriber. The intelligent network evaluates the event message and redirects call transfer for incoming calls independently and flexibly.

Preferably, the change to the destination list is made on the basis of various parameters, such as time of day, date and/or inputs during logging on and/or off. This makes it possible, for example, for the subscriber to log off at his or her terminal in the office for the lunch break, as a result of which an event message is transmitted to the intelligent network together with the current time of day, and the destination list is changed in the intelligent network such that incoming calls for the subscriber are automatically answered in order to inform callers that the subscriber is at lunch.

The method takes a particularly simple form if the destination list is changed using a user identifier for the subscriber. Usually, the subscriber logs on at a terminal using a user identifier which can be transmitted to the intelligent network in the event message. This corresponds to authentication of the subscriber, which makes the method independent of particular terminals. The only prerequisite for carrying out the method is that, accordingly, a terminal which the user uses to log on or off must have access to the intelligent network.

Expanding on this concept, in another advantageous embodiment, an identifier for the terminal at which the subscriber logs on or off is transmitted, as a result of which the whereabouts of the subscriber easily can be determined in the intelligent network by evaluating an appropriate database. This determination of whereabouts can influence the change to the destination list such that, by way of example, incoming calls for the subscriber are always routed to a landline connection in the vicinity of the appropriate terminal. If no landline connection is available in the vicinity of the terminal, it is also possible to switch automatically to a mobile connection, a mailbox or a recorded announcement. As such, the destination list is dynamically adjusted to the whereabouts of the subscriber. In this context, whereabouts are naturally understood to be the terminals at which the subscriber logs on or off.

In another embodiment of the method of the present invention, the destination list is automatically changed at prescribed times of day or on particular days such that all incoming calls for the subscriber are routed to a mailbox or are answered using an automatic recorded announcement. Alternatively, change to the destination list also can be blocked at particular, prescribed times of day or on particular days. Accordingly, for example, incoming calls for the subscriber on the weekend always can be routed to the subscriber's mobile telephone or answered using an automatic recorded announcement.

Preferably, the event message also can be transmitted in the form of a short message, as is frequently used in mobile telephones. As such, in principle, the destination list also can be changed from a mobile telephone; i.e., the mobile telephone can be used as a terminal for logging on or off.

The event message is preferably transmitted to a server in the intelligent network via an Internet protocol link, since an Internet link or an Internet connection in terminals is very common and inexpensive. In principle, this operation can be performed by a program executed upon logging on or logging off, specifically such that, upon logging on or logging off, the program sets up an Internet link to the server in the intelligent network and transmits the aforementioned event message to this server. Preferably, the server forms a service management node of the intelligent network; i.e., the event message is transmitted directly to a service management node. In this embodiment, an appropriate set of functions for processing the event message is made available on a server provided as service management node. This set of functions typically can be introduced by making additional program modules available on the server.

As an alternative to transmission of the event message to a server via an Internet protocol link, transmission also can be effected by radio to a base station coupled to the intelligent network. Preferably, the base station will be part of a mobile radio network which is, in turn, coupled to the intelligent network.

In professional applications, the terminal used is typically a personal computer (PC). Preferably, the PC can be linked into a local area computer network, for example, in a company, in small offices or in the private sector. If linked into a local network, it is sufficient, in principle, for one computer in the network to have a link to the intelligent network, such as a "gateway server" used to perform all access operations from the local area network, for example to the Internet or to a WAN (Wide Area Network).

The PC also can be linked into the local area computer network via a radio interface. This is found to be particularly useful for portable terminals, such as laptops, since a line-connected link, which is usually subject to interference, between the terminal or the PC and the local area network is dispensed with. If the terminal or the PC is in the radio coverage area of the radio interface, the subscriber can log into the corresponding local area computer network using the terminal or the PC, and an appropriate event message for changing the destination list in the intelligent network can be sent at the same time.

The destination list is preferably in the form of a database in the intelligent network. The database has entries which associate particular destinations with the subscriber during predetermined time periods. These entries may be regarded as standard entries which can be changed at any time using the method according to the present invention. By way of example, the entries can be set to stipulate that the subscriber can be reached on his or her landline connection in the office during a period from 8:00 hours to 17:00 hours, and can be reached on his or her landline connection at home from 17:00 hours to 8:00 hours. Incoming calls for the subscriber are then redirected or transferred on the basis of these values set in the destination list. However, this can be changed, for example, by the subscriber logging on at his or her terminal at home at 9:00 hours, which automatically changes the destination list such that incoming calls are diverted to the subscriber's landline connection at home.

The event message preferably is evaluated by taking into account conditions such as date, time of day and/or conditions prescribed by the subscriber. As such, the prescribed or set conditions are used to ascertain a corresponding entry in the database, and incoming calls for the subscriber are transferred to a connection indicated as destination in the ascertained database entry.

Additional features and advantages of the present invention are described in, and will be apparent from, the Detailed Description of the Preferred Embodiments and the Drawings.

DESCRIPTION OF THE DRAWINGS

FIG. 1 shows a block diagram drawing of an intelligent network to which the method of the present invention is directed.

DETAILED DESCRIPTION OF THE PREFERRED EMBODIMENTS

A service management node 10 of an intelligent network has a subscriber's destination list 11 containing entries 12 which can be changed by a call routing controller 13.

The call routing controller 13 receives from a terminal 14, via a line 15, event reports or messages from the terminal which relate to logon or logoff by the subscriber having the associated destination list 11. As soon as the subscriber logs on at the terminal 14, the terminal, more precisely a program provided for it, generates an event message containing the terminal identity and the user identifier for the subscriber, and transmits it to the call routing controller 13 at the service management node 10 of the intelligent network.

The call routing controller 13, in turn, uses the transmitted user identifier for the subscriber to search for the corresponding destination list 11 from a database, and automatically changes that entry in the destination list 11 which is associated with the current time such that incoming calls for the subscriber are no longer transferred to a first landline connection 16, but are instead transferred to a second landline connection 17 located close to the terminal 14.

So long as the subscriber is logged on at the terminal 14, all incoming calls are routed to the second landline connection 17. As soon as the subscriber logs off from the terminal 14, an event message is again transmitted via the line 15 to the call routing controller 13. The call routing controller changes that entry 12 in the destination list 11 which is associated with the current time such that all incoming calls for the subscriber are routed to the first landline connection 16, which is situated at the subscriber's home.

The terminal 14 is coupled via a LAN 19 (Local Area Network) to other terminals 14'–1'", which may be situated in other locations; for example, in different rooms or buildings. The subscriber is able to log on at any of these terminals 14'–14'", as a result of which an appropriate program is used to send an event message from the respective terminal to the terminal 14 via the LAN 19. The terminal 14, in turn, transfers the event message received to the intelligent network.

Finally, another mobile terminal or telephone 20 is shown which has a radio link to a base station 21 in a mobile radio network 22. The mobile radio network 22 is connected to the service management node 10 of the intelligent network via a link 23 so that, when the mobile terminal or telephone 20 of a subscriber registers with the base station 21, an event message is transmitted to the call routing controller 13 via the mobile radio network 22 and the link 23. This event message provides the destination list 11 with an entry stipulating that the subscriber currently can be reached on his or her mobile terminal or telephone 20.

The text below explains somewhat more complicated redirection of call transfers on the basis of the inventive method:

During leisure time, the subscriber A can be reached, alternatively, on a mobile telephone, on a landline connection at home or on a telephone answering machine. During work time, the subscriber can be reached on a landline connection in the office, on a connection for the subscriber's secretary, on a mobile telephone or on a telephone answering machine. As soon as the subscriber logs on at his or her PC in the office, an event message or a trigger is automatically transmitted to an intelligent network using the subscriber's user identifier. The transmission also may be effected by short message, e-mail or using the Internet protocol.

In the intelligent network, a service management node receives the event message or the trigger and automatically changes over a destination list associated with the subscriber A from leisure time to office time. As a result, all incoming calls are automatically routed to the connections which are appropriate for office time in the destination list.

If the subscriber does not log on at a personal computer in the office, but instead at another personal computer, for example in another room, at work this personal computer likewise transmits an event message or a trigger to the service management node of the intelligent network. At the service management node, the event message received is evaluated, and it is established that this message does not originate from the personal computer of subscriber A, but instead from another personal computer. An entry in the destination list of subscriber A is then changed such that all calls for subscriber A are diverted to a landline connection located in the vicinity of the personal computer at which the subscriber has logged on. To this end, the service management node evaluates a database in which landline connections are associated with PCs.

When subscriber A takes a lunch break, he or she can use an appropriate program on the PC at which the subscriber is currently logged on to generate an event message which changes the destination list such that incoming calls are answered using an automatic recorded announcement. The subscriber also can change the destination list if he or she goes to a meeting. In this case, the subscriber can again use the PC at which he or she is currently logged on to generate an event message which informs the service management node of the intelligent network that subscriber A is in a meeting. The service management node can then automatically change the destination list such that all incoming calls are answered using an automatic recorded announcement which is provided specifically for meetings and, by way of example, gives a caller further details about the length of the meeting, for example.

When the subscriber logs off the PC, an event message is again generated which changes over the destination list such that all incoming calls for the subscriber are diverted on the basis of the settings for leisure time.

Alternatively, automatic changing of the destination list can be prevented or even turned off by virtue of a request appearing when the subscriber logs on at a PC, which request can be used to stipulate that the entries in the destination list are not to be changed as a result of logging on and/or off. This is advantageous if, by way of example, all calls need to be routed to a mailbox so as not to disturb the subscriber.

During vacations or business trips, the method according to the present invention also can be used to change over the destination list more easily and flexibly than previously. In particular, it is not necessary to record new announcements on telephone answering machines. Instead, it is a simple matter to indicate when logging off from the PC that the subscriber is on vacation. Call transfer is then changed over in the intelligent network such that any incoming call for the subscriber is either routed to a mailbox or is automatically answered, indicating vacation or business trip.

Although the present invention has been described with reference to specific embodiments, those of skill in the art will recognize that changes may be made thereto without departing from the spirit and scope of the invention as set forth in the hereafter appended claims.

I claim as my invention:

1. A method for destination control in an intelligent network, the method comprising the steps of:

providing a destination list for a subscriber's telephone number, the destination list having a plurality of entries associating particular connections with the subscriber during predetermined time periods such that incoming calls to the subscriber's telephone number are transferred to an appropriate connection indicated as destination in a corresponding entry;

transmitting an event message automatically when the subscriber at least one of logs on and logs off at a terminal using an access point to the intelligent network;

evaluating the event message by taking into account current conditions; and changing the destination list wherein a corresponding entry in the destination list is at least one of ascertained and changed based on the step of evaluating.

2. A method for destination control in an intelligent network as claimed in claim 1, wherein the terminal is a computer terminal.

3. A method for destination control in an intelligent network as claimed in claim 1, wherein the terminal is a mobile telephone terminal.

4. A method for destination control in an intelligent network as claimed in claim 1, wherein the destination list is changed based on at least one of time of day, date, prescribed conditions, inputs during logging on and inputs during logging off.

5. A method for destination control in an intelligent network as claimed in claim 1, wherein the destination list is changed using a user identifier for the subscriber.

6. A method for destination control in an intelligent network as claimed in claim 1, the method further comprising the steps of:

transmitting an identifier for the terminal, upon logging on, to the intelligent network; and using the identifier to determine a location for the subscriber which influences the change to the destination list.

7. A method for destination control in an intelligent network as claimed in claim 1, wherein the destination list is automatically changed at least one of at prescribed times of day and on particular days such that all incoming calls for the subscriber are one of routed to a mailbox and answered using an automatic recorded announcement.

8. A method for destination control in an intelligent network as claimed in claim 1, the method further comprising the step of:

blocking changes to the destination list one of at prescribed times of day and on particular days.

9. A method for destination control in an intelligent network as claimed in claim 1, wherein the event message is a short message.

10. A method for destination control in an intelligent network as claimed in claim 1, wherein the event message is transmitted via an Internet protocol link to an intelligent network server which forms a service management node of the intelligent network.

11. A method for destination control in an intelligent network as claimed in claim 1, wherein the event message is transmitted by radio to a base station coupled to the intelligent network, the intelligent network being a mobile radio network.

* * * * *